United States Patent [19]

Migdal

[11] Patent Number: 5,606,244
[45] Date of Patent: Feb. 25, 1997

[54] MOBILE AC POWER SOURCE SYSTEM

[75] Inventor: Victor Migdal, Herzelia, Israel

[73] Assignee: Ofer Energies Ltd., Jerusalem, Israel

[21] Appl. No.: 102,688

[22] Filed: Aug. 5, 1993

[51] Int. Cl.$^6$ .................................................. H02J 3/12
[52] U.S. Cl. ........................... 322/7; 307/16; 322/90; 322/22
[58] Field of Search ................................ 322/7, 25

[56] References Cited

U.S. PATENT DOCUMENTS

| | | |
|---|---|---|
| 248,421 | 10/1881 | Edison . |
| 3,316,416 | 4/1967 | Carlson . |
| 3,586,868 | 6/1971 | Martens et al. . |
| 3,660,671 | 5/1972 | Peterson . |
| 3,668,514 | 6/1972 | Peck . |
| 3,676,694 | 7/1972 | Schneider et al. . |
| 3,770,976 | 11/1973 | Stroud et al. . |
| 3,894,242 | 7/1975 | Helling . |
| 3,899,652 | 8/1975 | Terry et al. . |
| 4,100,474 | 7/1978 | Pfeffer et al. . |
| 4,164,785 | 8/1979 | Young et al. ............................ 363/50 |
| 4,239,974 | 12/1980 | Kofink . |
| 4,257,091 | 3/1981 | Kaufman . |
| 4,340,823 | 7/1982 | Miyazawa ............................ 307/66 |
| 4,599,687 | 7/1986 | Smith . |
| 4,692,684 | 8/1987 | Schaeffer . |
| 4,705,934 | 11/1987 | Winkler . |
| 4,808,842 | 2/1989 | Hughes . |
| 4,827,393 | 5/1989 | Clark ............................... 363/79 |
| 4,853,577 | 8/1989 | Meier et al. . |
| 4,868,480 | 9/1989 | van der Linde . |
| 4,884,018 | 11/1989 | Meuret et al. . |
| 4,956,598 | 9/1990 | Recker et al. ........................ 322/28 |
| 4,973,896 | 11/1990 | Shiga . |
| 5,017,857 | 5/1991 | Fox .................................. 322/25 |
| 5,086,266 | 2/1992 | Shiga et al. ......................... 322/28 |
| 5,151,641 | 9/1995 | Shamoto ............................. 318/762 |
| 5,406,189 | 4/1995 | Wolhlberg et al. .................... 322/10 |

Primary Examiner—Steven L. Stephan
Assistant Examiner—Nicholas Ponomarenko
Attorney, Agent, or Firm—Cowan, Liebowitz & Latman, P.C.

[57] ABSTRACT

A mobile AC power source is described for generating AC electrical power that is powered by any rotational energy source such as a vehicle engine. The output of the mobile generator is sinusoidal but could have other shapes as well and is stable with variations in load and engine RPM. The AC output can vary in voltage from approximately 100 to 500 VAC RMS and in frequency from approximately 40 to 400 Hz. The mobile AC power source employs an alternator driven by the vehicle engine or any other rotational source and incorporates two stator windings and one rotor, or two stators, four windings and two rotors on a common shaft. The stator windings are insulated electrically from each other. AC output voltage is held constant by using the voltage produced by the alternator as feedback and controlling the alternator rotor current. A voltage step up circuit boosts the voltage from the alternator if it is below a threshold value as occurs at low engine RPM. A 2 quad PWM circuit encodes a low frequency sine wave onto a high frequency carrier. An output filter removes the high frequency carrier and produces a sine wave output. Also included is electronic protection against over current, over load, short circuit and thermal over load conditions.

20 Claims, 13 Drawing Sheets

FIG. 7
FIG. IS PART OF ITEM 30 OF FIG.1

FIG. 8  FIG. IS PART OF ITEM 30 OF FIG.1

FIG. 9 FIG. IS PART OF ITEM 30.OF FIG.1

MOBILE AC POWER SOURCE SYSTEM

BACKGROUND OF THE INVENTION

Mobile electrical generators have been in use for a relatively long time. A very desirable feature of mobile generators is portability. Portability makes it easy and convenient to have electrical power handy when and where it is needed. Existing mobile generators suffer from certain drawbacks and disadvantages. For example, the majority of existing portable electrical generators are relatively big and unwieldy. Most are powered by heavy gasoline engines. This requires a user to buy and store fuel in order to keep them running. Also, engines require maintenance to be performed relatively frequently so that they start and run reliably. In addition, gas powered portable generators weigh a considerable amount and cannot be lifted and maneuvered without a modest amount of effort.

There is a long felt need for a mobile electrical generator that is relatively inexpensive, portable, reasonably light, simple to maintain, generates AC electrical power and does not require an unwieldy dedicated gasoline engine to power it. The present invention addresses and fulfills these needs.

SUMMARY OF THE INVENTION

A primary object of the present invention is to provide a system capable of providing an AC power supply and optionally a DC power supply that is both highly mobile and efficient utilizing the output of an alternator.

Another object of the present invention is to provide a mobile power generator that can be installed in an engine such as a vehicle engine, or any other engine or rotating system of power, for example, by wind or water.

Yet another object of the present invention is to provide low distortion AC voltage and current that is very stable notwithstanding variations in the load and RPM fluctuations.

Still yet another object of the present invention is to provide protection electronically against short circuit, over current, over load and thermal over load conditions.

Yet another object of the present invention is to provide a mobile AC power source with an efficiency greater than 85% in generating the output voltage.

Still yet another object of the present invention is to provide a mobile AC power source capable of easy and fast maintenance by utilizing a modular systems approach in its design.

The foregoing and other objects and advantages which will be apparent in the following detailed description or in the practice of the invention, are achieved by the invention disclosed herein, which generally may be characterized as a mobile AC power source comprising alternator means disposed to receive a rotational driving input from a vehicle engine and circuit means operative in association with the alternator means for providing floating AC power.

BRIEF DESCRIPTION OF THE DRAWINGS

Serving to illustrate exemplary embodiments of the invention are the drawings of which.

DETAILED DESCRIPTION OF THE INVENTION

In order to afford a complete understanding of the invention and an appreciation of its advantages, a description of a preferred embodiment of the present invention in a typical operating environment is presented below.

Figure 1:
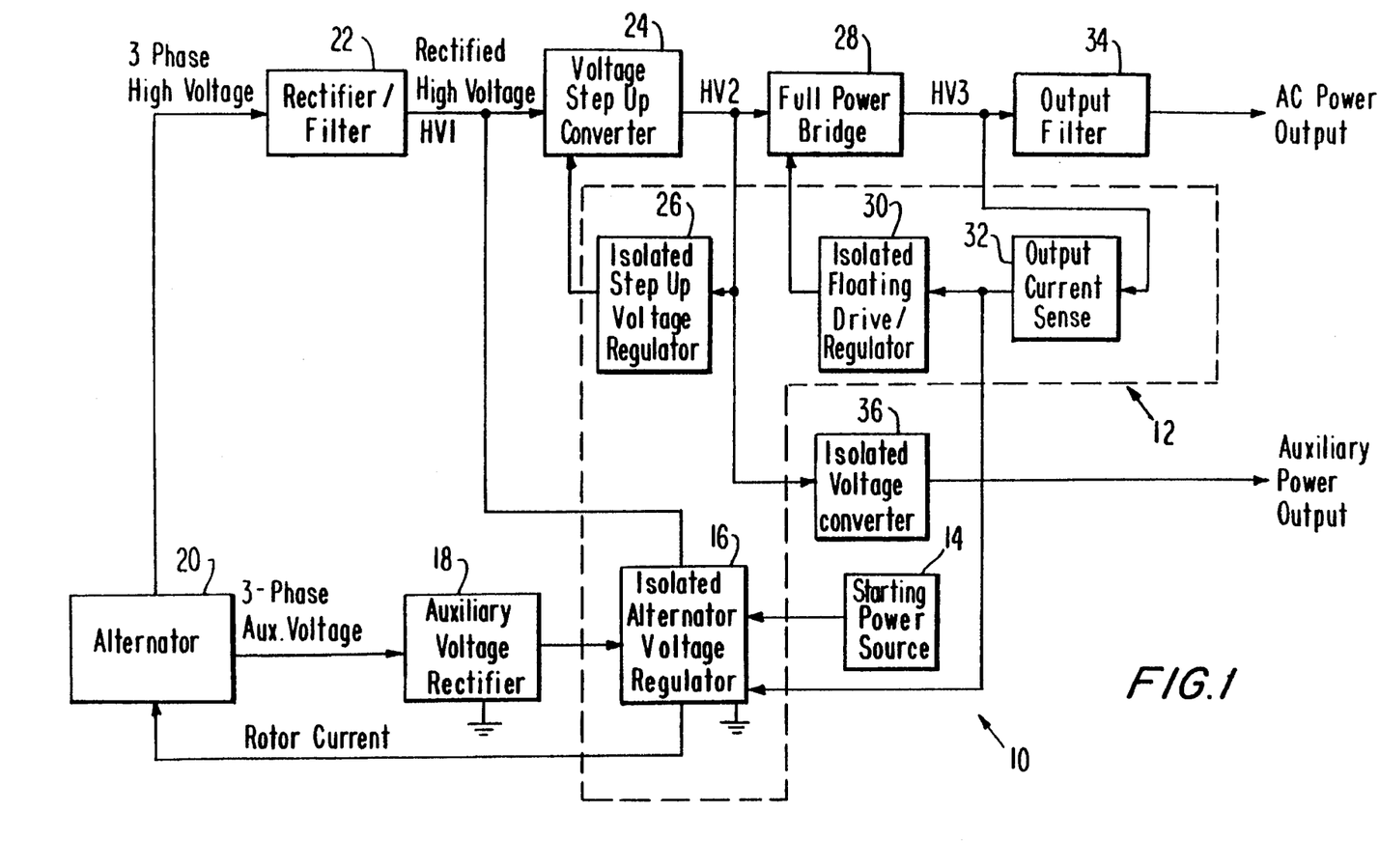
FIG. 1 is a functional block diagram of a preferred embodiment of the present invention.

Shown in FIG. 1 is a functional block diagram of a preferred embodiment of the invention. The AC mobile power generator 10 consists of an alternator 20, controller 12, starting power source 14 and additional circuitry to perform filtering, voltage conversion and rectification. The alternator 20 is powered by a source of mechanical energy such as the rotational drive provided by a car or truck engine or any other rotational energy source. It can replace the standard alternator already present in the engine or it can be installed in the engine as a second alternator. The alternator 20 is disposed in the engine so as to utilize the rotational energy supplied by the engine. The rotational energy turns a rotor which induces a high voltage electrical energy by stators in the alternator 20. The alternator 20 generates a 3 phase high voltage and a 3 phase auxiliary low voltage. The 3 phase auxiliary voltage is rectified by the auxiliary voltage rectifier 18 to produce a rectified auxiliary voltage (i.e. charging or welding voltage) and is then fed into the isolated alternator voltage regulator 16. Both the rectifier 18 and the regulator 16 are referenced to ground. The 3 phase high voltage generated by the alternator 20 is rectified and filtered by the rectifier/filter 22 to produce a rectified high voltage HV1. This high voltage is fed back to the voltage regulator 16 which in turn controls the flow of rotor current in the alternator 20.

The rectified high voltage is input to a voltage step up converter 24. This circuit functions to step up the input voltage HV1 if it is less than a predetermined value. In order to achieve a specified AC output voltage from the mobile power generator 10, it is necessary to generate a stable DC voltage at a suitable level. At low engine RPM the voltage HV1 generated by the alternator 20 might not be sufficiently high. In this case the step up converter 24 boosts the voltage HV1 up to the proper level. The stepped up voltage HV2 output by the converter 24 is fed back to the isolated step up voltage regulator 26. The regulator 26 senses when the voltage HV2 is below a predetermined threshold and provides a control signal to the step up converter 24 to boost it to the proper level.

The high DC voltage HV2 is input to the full wave bridge rectifier 28 which converts it to a train of pulses at its output HV3. The output HV3 is a train of pulses at a frequency of 14 KHz modulated by a low frequency proportional to the desired AC sine wave output frequency. A two quad pulse width modulator (PWM) in the isolated floating bridge drive/regulator 30 generates a carrier signal having a frequency of approximately 14 KHz which in turn is modulated by an internally generated sine wave at the desired frequency (i.e. 50 Hz). The output pulse train HV3 is filtered and smoothed by the output filter 34 to produce the desired AC sine wave output. It is noted that the wave shape of the AC output is not limited to a sinusoidal but can be made other shapes as well.

To protect against a short circuit of the output and against over load conditions, output current sense 32 senses output inductor current and shuts the rectifier drive/regulator 30 down when the current reaches a predetermined upper limit. In addition to the main AC sine wave output, an additional DC voltage output can be generated by the isolated voltage converter 36. This converter 36 is an option and is useful if the user needs a DC voltage output in addition to the AC voltage output. The converter 36 takes the high voltage HV2 (or HV1) and generates a lower DC voltage that can range from 1 to 370 VDC that be used, for example, for charging batteries, running DC power tools or for welding.

Figure 2:
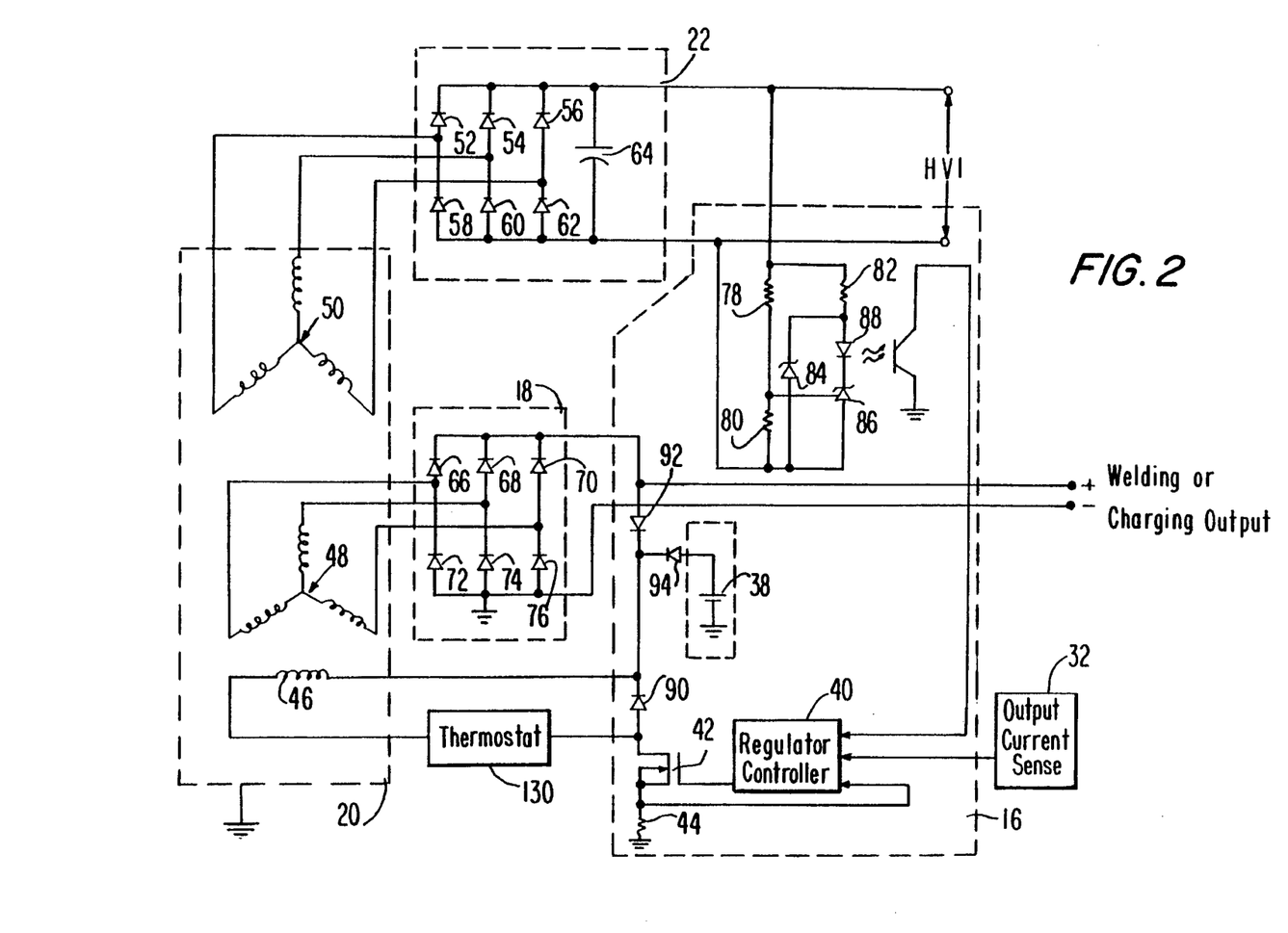
FIG. 2 is a detailed schematic diagram of the circuit comprising a preferred embodiment of the alternator, rectifiers and alternator voltage regulator of the present invention.

Shown in FIG. 2 is a detailed schematic of the alternator 20, auxiliary voltage rectifier 18, rectifier/filter 22 and isolated alternator voltage regulator 16. Alternator 20 is also disclosed in applicant's copending application Ser. No. 07/697,217 which is assigned to the assignee hereof and whose disclosure is incorporated herein by reference. The alternator 20 consists of a rotor 46 and two stator windings 48 and 50. One stator 48 generates relatively low voltage (i.e. up to 50 volts) and the other stator 50 is capable of generating high voltage (i.e. ~260 VAC RMS). The stator 50 is wound so that the alternator 20 can generate a high enough voltage to obtain the desired AC output voltage. When current is flowing through the turning rotor 46 coil current flow is induced in both stator windings 48 and 50. Three phase auxiliary current is generated and rectified by diodes 66, 68, 70, 72, 74, 76 comprising the auxiliary voltage rectifier 18. The rectified auxiliary voltage is used to provide current to the rotor 46 and can be used, for example, for welding or charging applications. Initially, however, no current is flowing through the rotor coil 46 and a starting power source 14 is required. Typically, the vehicle's battery 38 provides the initial current to energize the rotor coil 46. As soon as the stator winding 48 generates sufficient current, diode 94 becomes reverse biased and the battery 38 is no longer used.

The high voltage stator winding 50 generates the voltage needed to produce the AC output. For example, to produce an AC output voltage of 220 V the 3 phase high voltage level must be approximately 260 VAC RMS. It is important to note that any AC output voltage can be generated in the range of approximately 100 to 500 VAC RMS. The 3 phase voltage is rectified by diodes 52, 54, 56, 58, 60, 62 and then filtered by capacitor 64. The diodes and filter capacitor comprise the rectifier/filter 22. The output of the rectifier/filter 22 is a stable DC voltage HV1.

Figure 12:
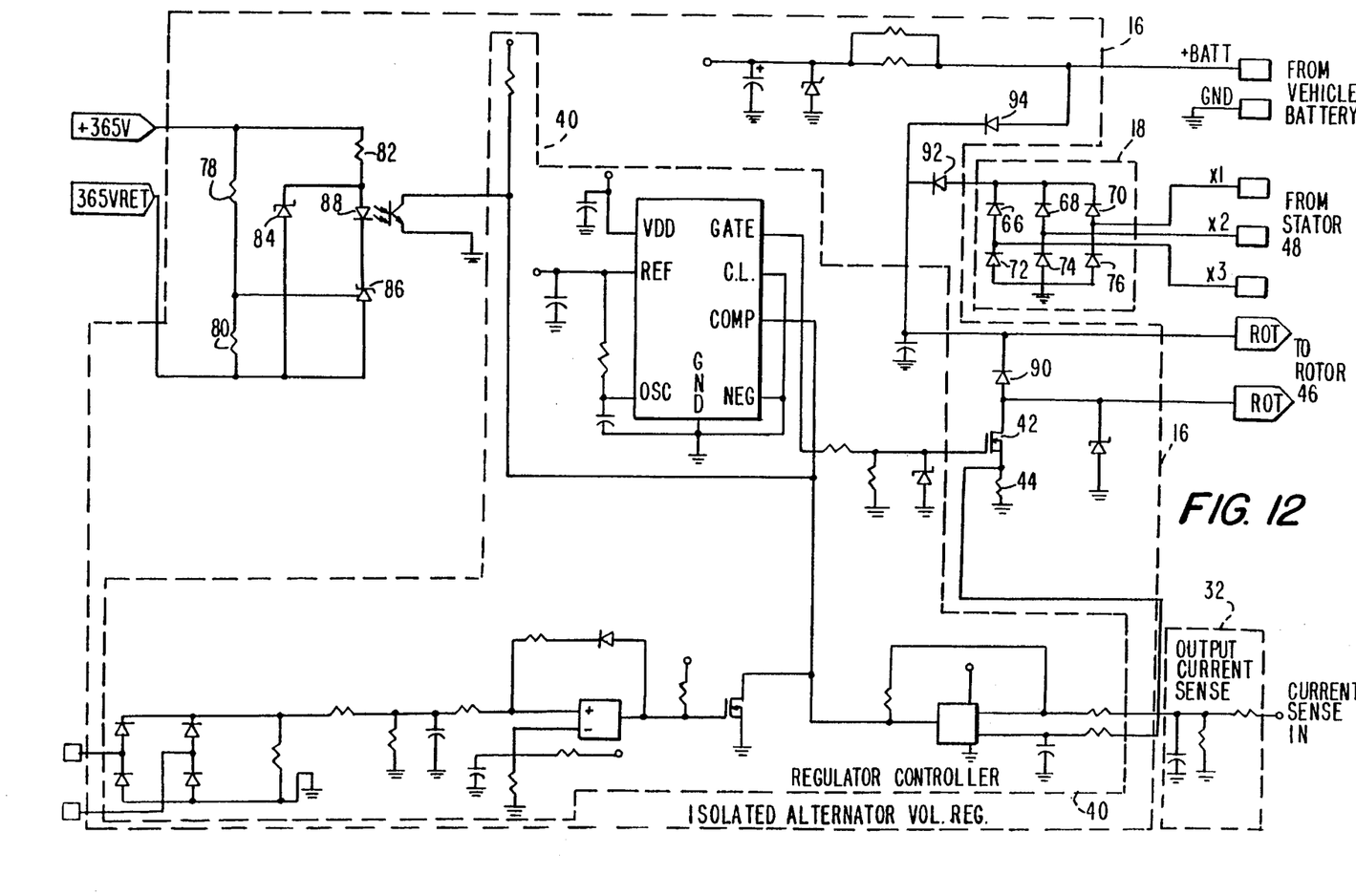
FIG. 12 is a detailed partial schematic diagram of the prototype of the preferred embodiment of the present invention.

In order to maintain the proper DC level, the voltage HV1 is sensed and if the level is too high the regulator controller 40 acts to decrease the current through the rotor 46. This lowers the current induced in the stator windings 48, 50 and the voltage HV1 is thereby lowered. Resistors 78, 80 form a voltage divider connected to the gate of Programmable Precision Reference (PPR) diode 86. When the PPR diode 86 gate threshold is reached (i.e. voltage HV1 exceeds its maximum) current flows through resistor 82 and the LED of opto isolator 88. The opto isolator provides electrical isolation of the floating rectified high voltage from the ground referenced control circuitry within the alternator voltage regulator 16. The output of the opto isolator 88 is input to the regulator controller 40. Regulator controller 40 uses PWM at approximately 800 Hz to control the gate of switch 42 (i.e. MOSFET or other suitable switching device). Current flows through the rotor 46 when switch 42 is in the on state. The regulator controller turns switch 42 off when voltage HV1 exceeds its maximum allowed level. When switch 42 turns off, the current gradually decreases to zero. In addition to maintaining HV1 at the proper level, regulator controller 40 also provides current limiting protection to the rotor 46. Rotor 46 current is controlled by sensing the voltage developed across resistor 44. If the rotor current exceeds a predetermined threshold the regulator controller 40, shown in FIGS. 2 and 12, turns the switch 42 off until the current is reduced to an allowed level. In addition, the output of the AC output current sense 32 is input to the regulator controller 40. If the AC output becomes overloaded or is accidentally shorted, the switch 42 is turned off preventing any rotor 46 current from flowing. This acts to prevent any voltage from being generated in the stator windings 48, 50.

In addition to current limiting the rotor 46 current thermal overload protection is provided. A thermostat 130 is located in series with the rotor 46 and is normally closed allowing rotor current to flow. It opens when a thermal overload condition is detected preventing possible damage to the generator 10 and the user.

The stator winding 48 can also be used in a welding and charging circuit (as disclosed in applicant's copending application Ser. No. 07/697,217) with an additional sensing circuit in the regulator controller 40.

Figure 3:
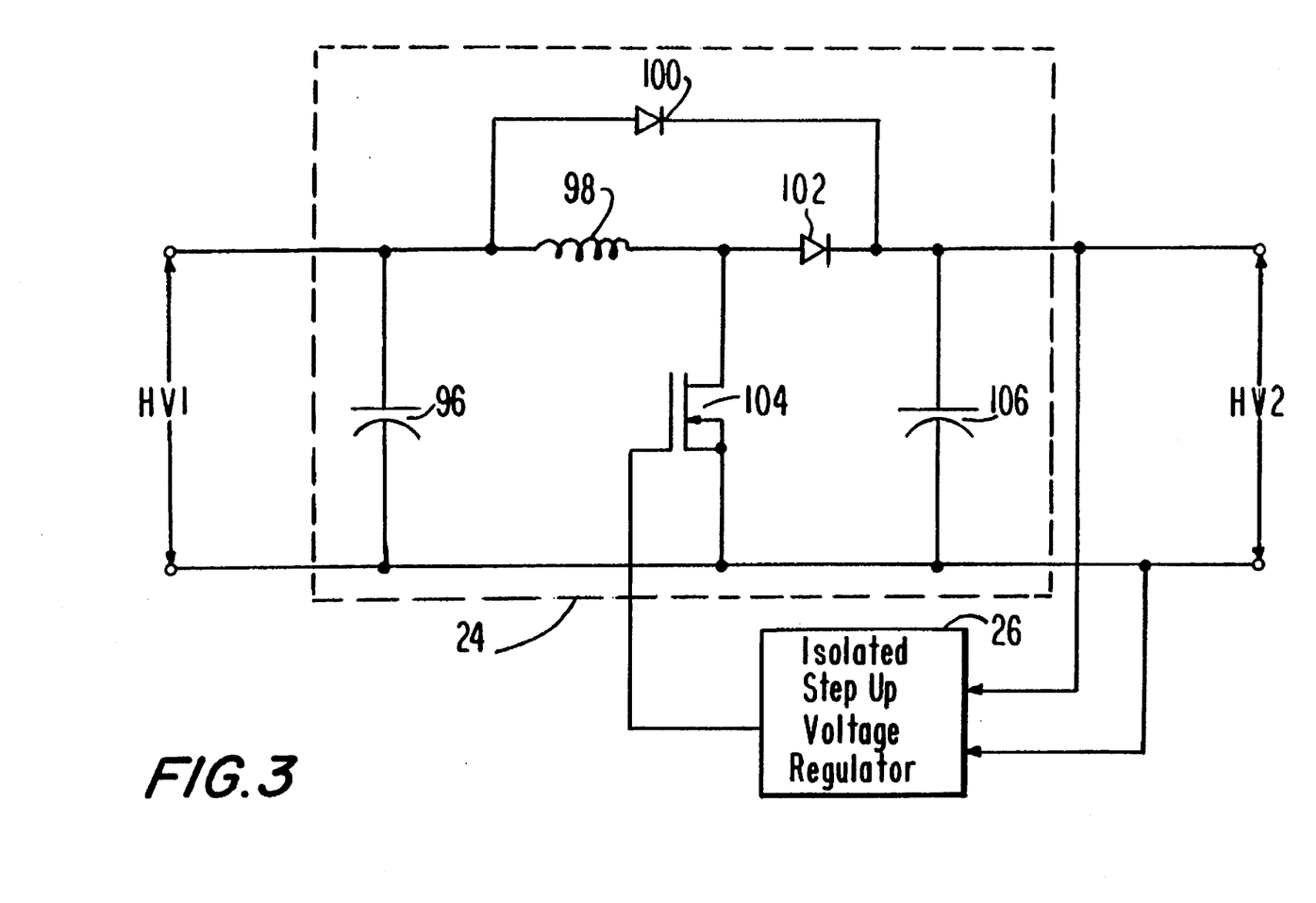
FIG. 3 is a detailed schematic diagram of the circuit comprising a preferred embodiment of the voltage step up converter of the present invention.

Shown in FIG. 3 is a detailed schematic of the voltage step up converter 24. The rotor 46 turns at a rate directly proportional to the RPM of the engine. At high RPM sufficient current is induced in the stator windings 48, 50 to generate the proper voltage HV1. However, at low engine RPM, the voltage HV1 generated is less then the level necessary to produce the AC output voltage. To correct this a voltage step up converter 24 is used to boost the voltage HV1 up to the proper level. Current flow through inductor 98 is switched on and off by switch 104 (i.e. Insulated Gate Bipolar Transistor (IGBT) or other suitable switching device). When the switch 104 turns off, the back EMF in the inductor 98 generates a higher voltage HV2. Capacitor 106 filters the voltage generated. A bypass diode 100 prevents current from flowing towards the rectifier/filter 22 and also serves to bypass current from the boost circuitry if the input voltage HV1 is at the proper level and does not need to be boosted. The isolated step up voltage regulator senses the voltage HV2 and turns the switch 104 on and off to maintain a stable DC output voltage HV2 (i.e. 370 V for 220 V desired output). The voltages HV1 and HV2 are compared with one another and the resulting output used to control a PWM whose output drives the gate of switch 104. The step up converter 24 only raises the voltage, the available power remains the same.

Figure 4:
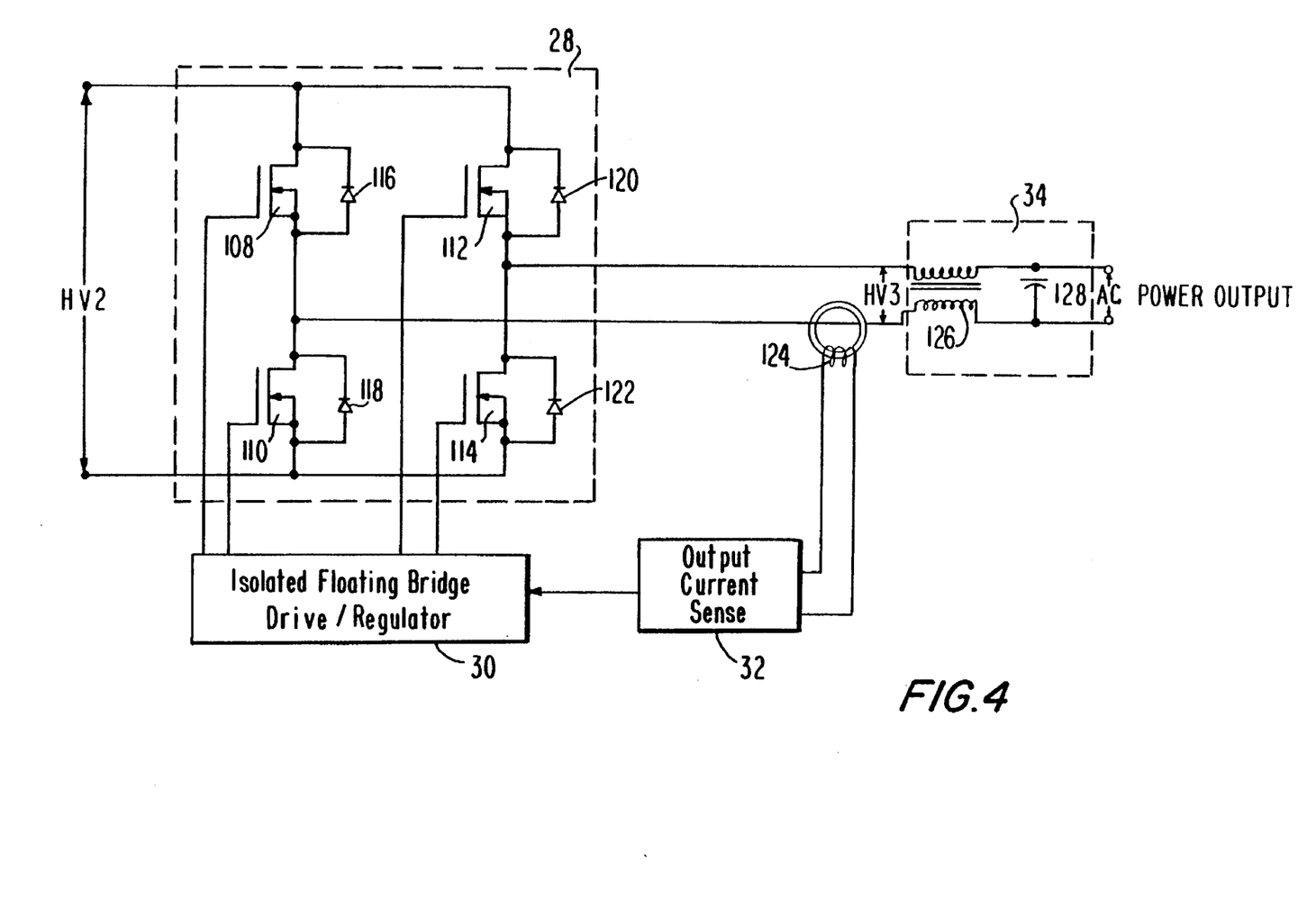
FIG. 4 is a detailed schematic diagram of the circuit comprising a preferred embodiment of the full power bridge and output filter of the present invention.
Figure 5:
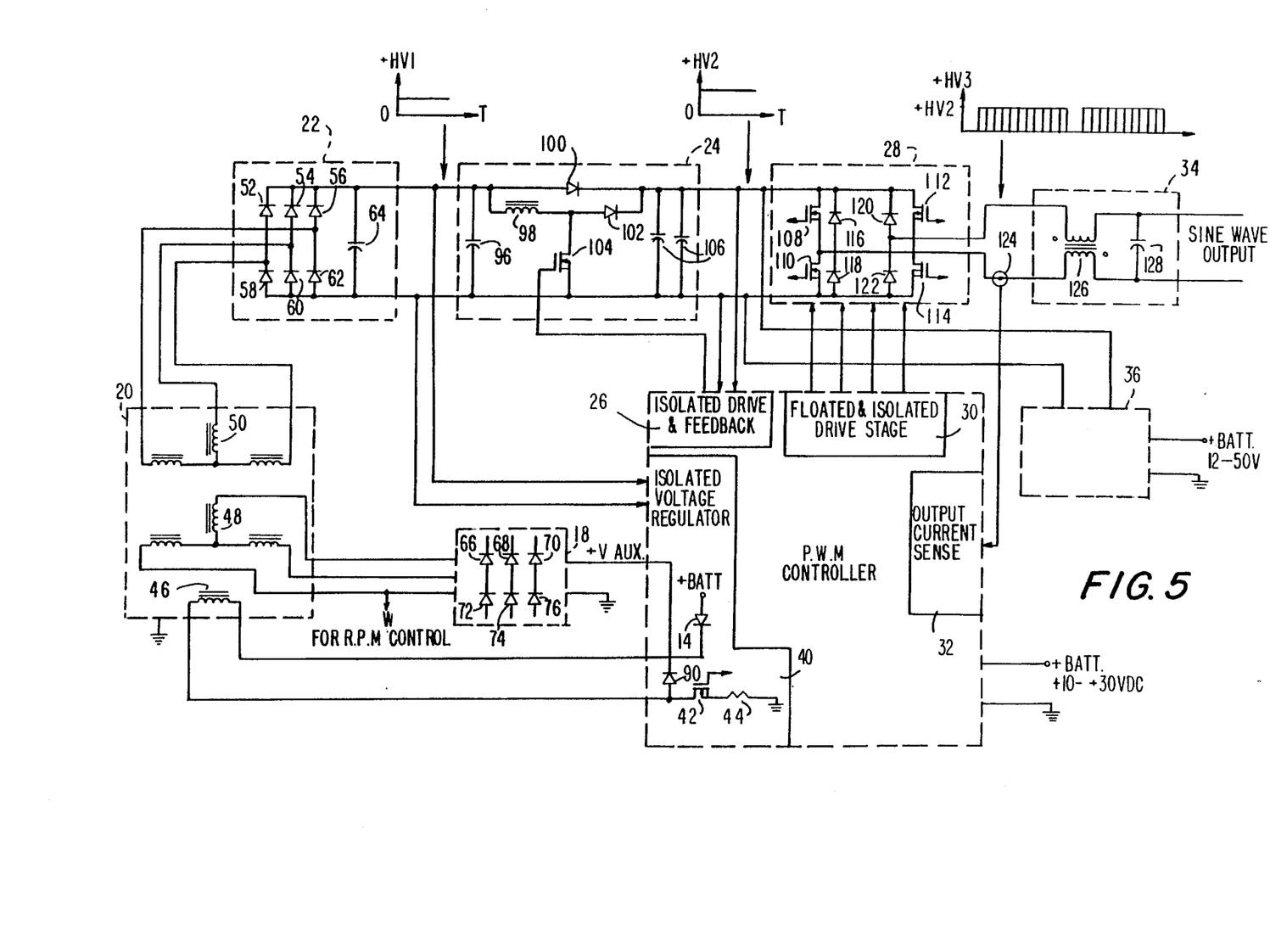
FIG. 5 is a functional block diagram of the prototype of the preferred embodiment of the present invention.
Figure 6:
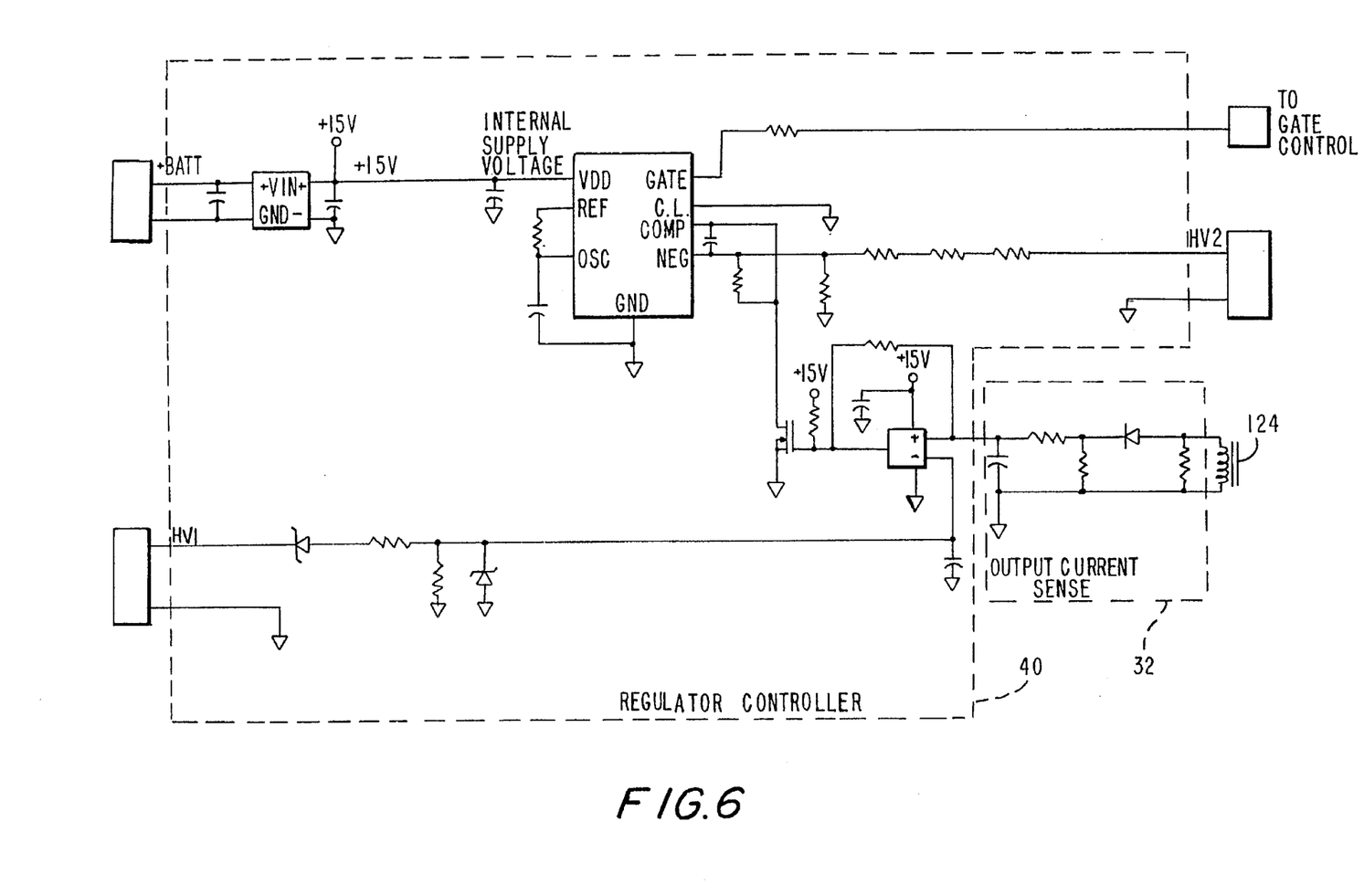
FIG. 6 is a detailed partial schematic diagram of the prototype of the preferred embodiment of the present invention.
Figure 7:
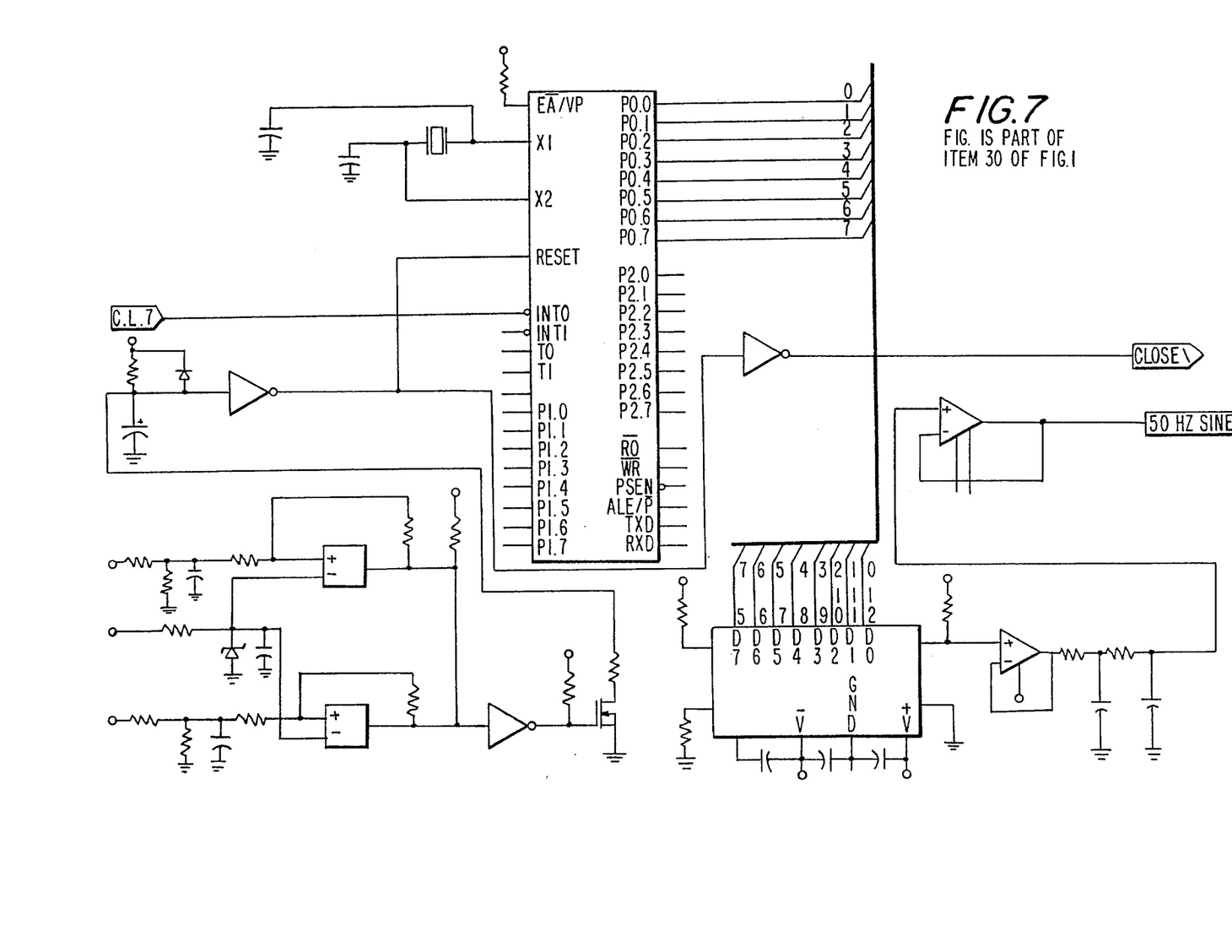
FIG. 7 is a detailed partial schematic diagram of the prototype of the preferred embodiment of the present invention.
Figure 8:
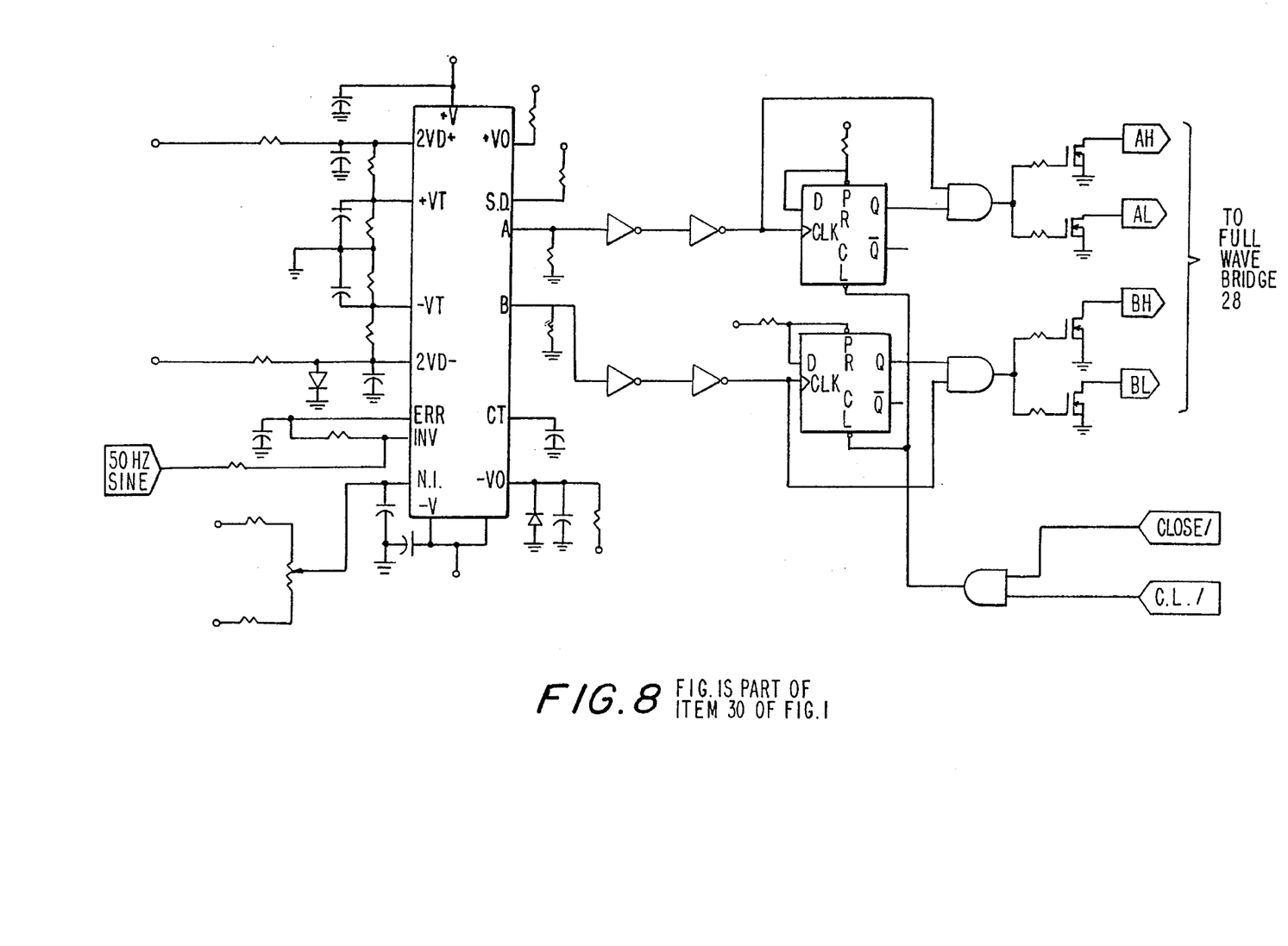
FIG. 8 is a detailed partial schematic diagram of the prototype of the preferred embodiment of the present invention.
Figure 9:
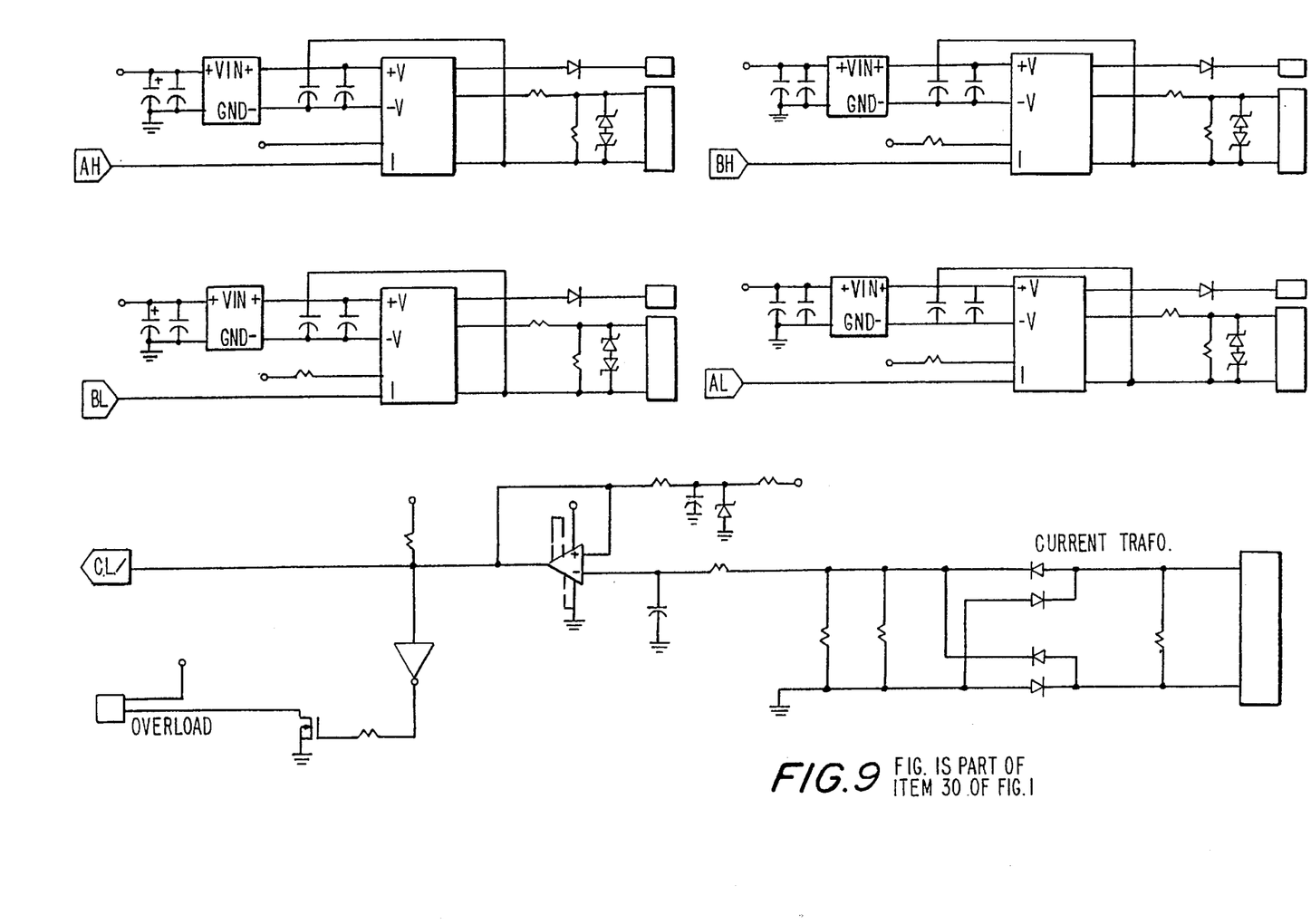
FIG. 9 is a detailed partial schematic diagram of the prototype of the preferred embodiment of the present invention.
Figure 10:
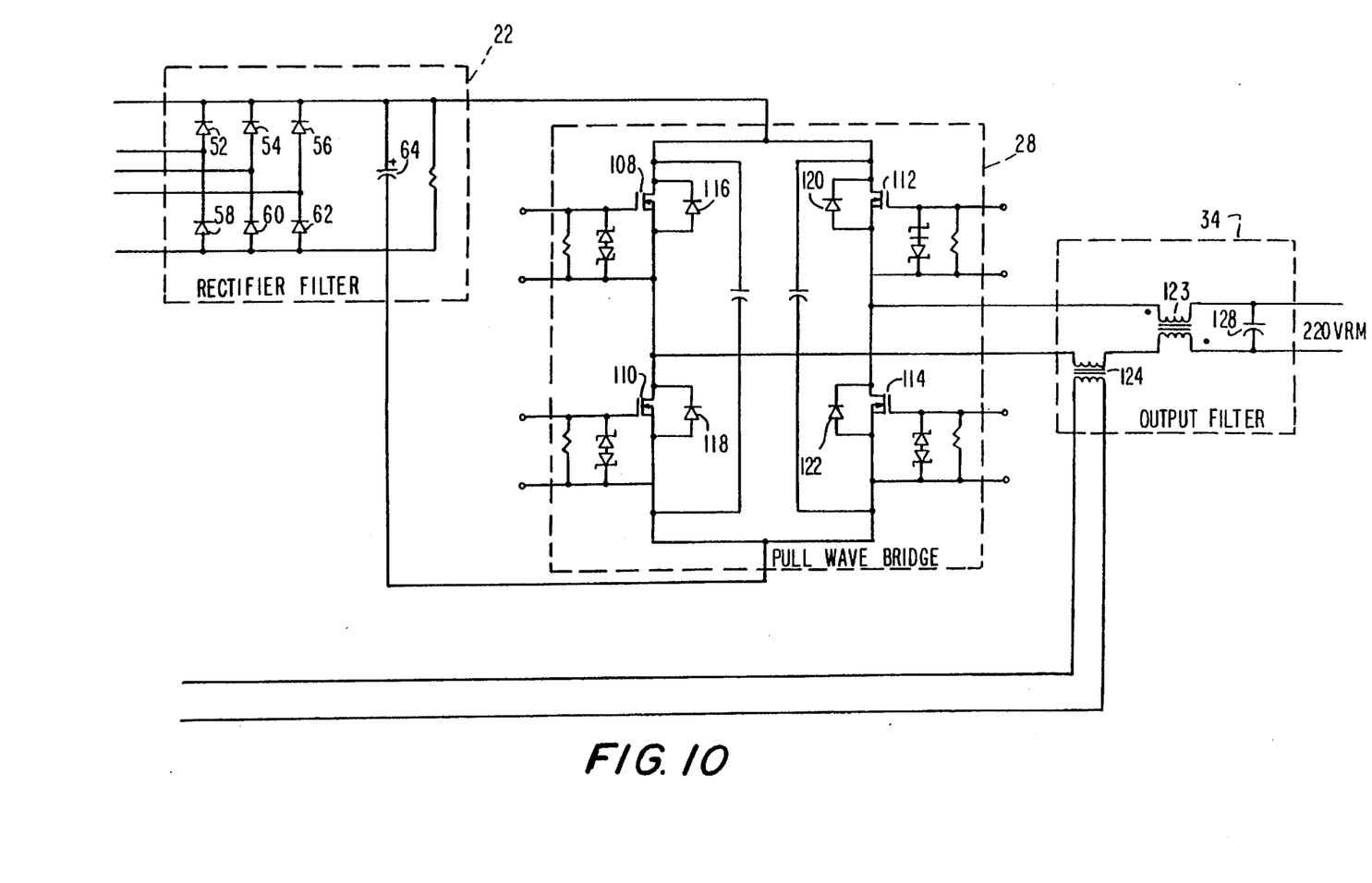
FIG. 10 is a detailed partial schematic diagram of the prototype of the preferred embodiment of the present invention.
Figure 11:
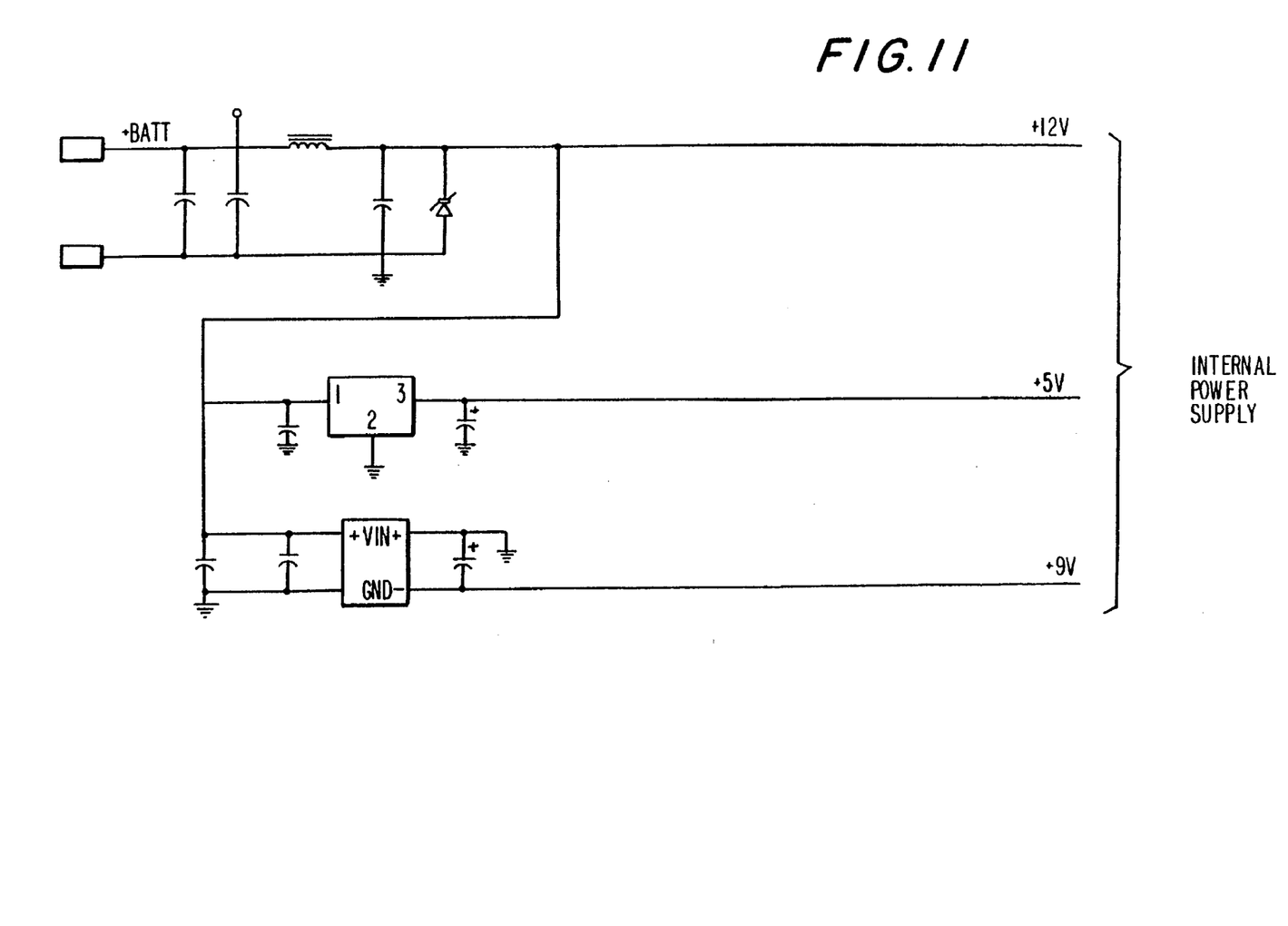
FIG. 11 is a detailed partial schematic diagram of the prototype of the preferred embodiment of the present invention.

Shown in FIG. 4 is a detailed schematic of the full wave bridge 28 and the output filter 34. Its function is to output a train of high voltage pulses HV3 encoded by a sine wave. The stable DC voltage HV2 is input to the bridge 28. Switches 108, 110, 112, 114 (i.e. IGBTs or other suitable switching devices) turn on and off at a frequency much higher than the desired AC output frequency. This high carrier frequency in turn is modulated by a sine wave having the desired output voltage frequency (i.e. 50 Hz).

The isolated floating bridge drive/regulator 30 utilizes a digital microcomputer to generate a sine wave. This sine wave is very stable and is not effected by variations in engine RPM and in load current including a no load condition. The frequency of the sine wave can vary over a range from about 40 Hz to 400 Hz. The drive/regulator 30 employs a 2 quad PWM running at approximately 14 KHz. This 14 KHz carrier is modulated by the sine wave with the desired output frequency.

Two channels are output from the drive/regulator 30. Switches 108, 114 form one channel and switches 110, 112 form the other channel. These two channels are alternately turned on and off. When one is on the other is off and vice versa. The turn on of each channel is delayed by a guard time of approximately 3 µs. Thus each channel is turned on approximately 3 µs after the other channel has turned off. This is to prevent the situation where both channels are on at once. Having all switches 108, 110, 112, 114 on simultaneously shorts out voltage HV2 and could destroy the mobile power generator 10. Diodes 116, 118, 120, 122 protect the switches 108, 110, 112, 114 from spikes when they are off by allowing return current to flow from the coupled inductor 126.

The switches 108, 110, 112, 114 turn on and off to generate a train of high voltage pulses which are then low pass filtered by the output filter 34. The transformer 126 and filter capacitor 128 act to filter out the 14 KHz carrier and produce a stable floating AC sine wave at the desired frequency. A key feature of this invention is that the AC sine wave output is floating and has no ground reference at all. No ground reference exists in the electrical path from the alternator 20 to the output filter 34 and the associated regulator circuitry in between.

To protect against an over load condition at the output and to provide current limiting capabilities a current transformer 124 senses the current flowing to the load. The output of the transformer 124 is input to the output current sense 32. If the load current exceeds a threshold the output current sense 32 causes the bridge drive/regulator 30 to shut down by keeping all the switches 108, 110, 112, 114 off until the over current condition is removed at which time switching is resumed.

In addition to generating an AC output voltage, a low DC voltage can also be generated. An optional isolated voltage converter 36 receives high voltage HV2 as its input and utilizes a DC/DC converter to produce a DC output voltage in a range from 1 to 370 VDC. This DC voltage output can supply high current for such applications as welding or battery charging.

An actual prototype of the system of the present invention has been built and is represented by FIGS. 5 through 12.

Figure 13:
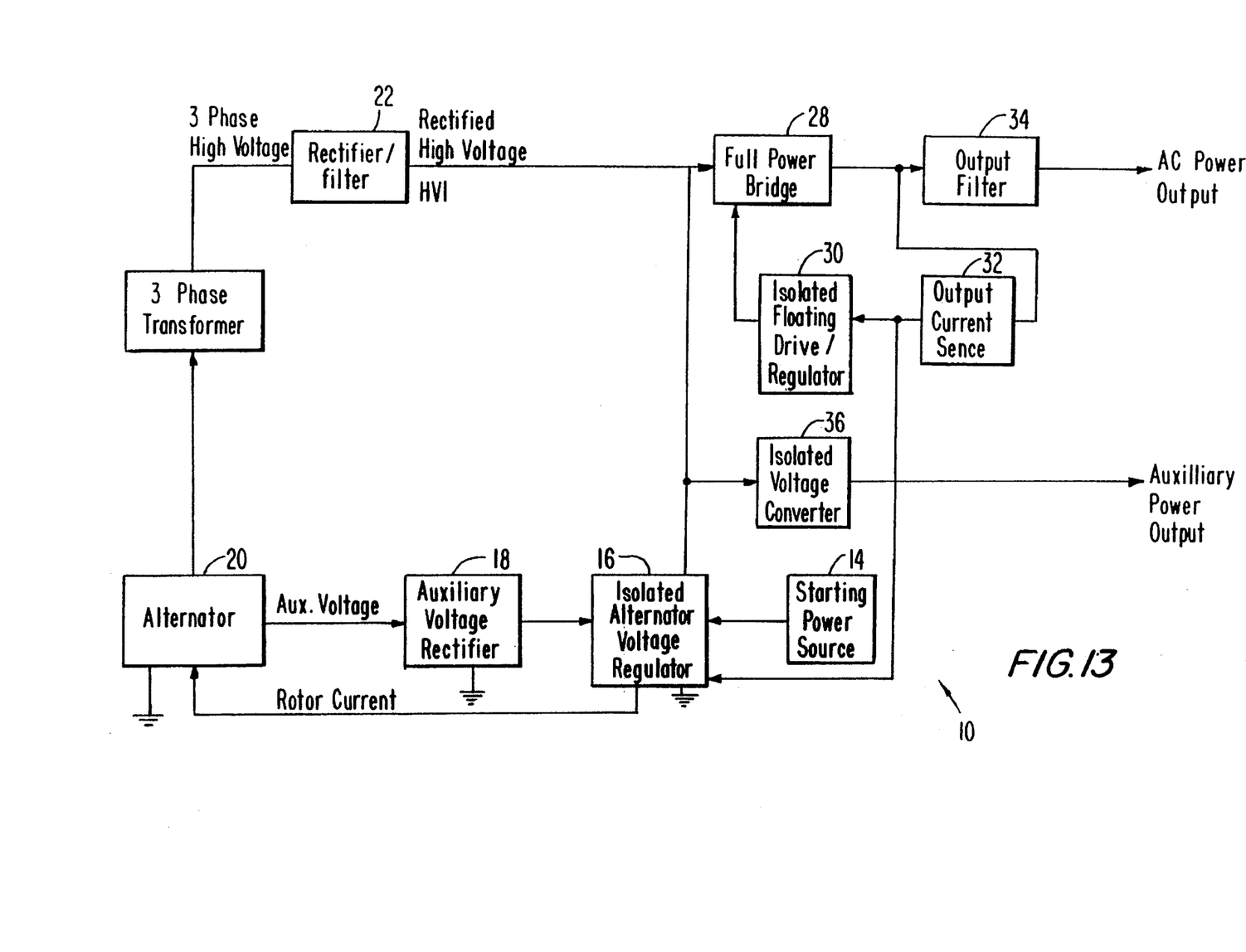
FIG. 13 is a functional block diagram of a preferred embodiment of the present invention.

It is clear to those skilled in the art that certain modifications may be made to the present invention. For example, as shown in FIG. 13, the voltage step up converter could be eliminated and a three phase step up or step down transformer placed between the alternator and rectifier/filter. In this configuration the isolated alternator voltage regulator 16 keeps the output of the alternator 20 at approximately the same fixed voltage level. Either a step up or step down transformer is then used to bring the voltage level either up or down depending on the floating AC output level desired.

Thus it is clear that the above description of the preferred embodiment in no way limits the scope of the present invention which is defined by the following claims.

What is claimed is:

1. A mobile AC power source comprising:

alternator means driven by a rotational driving force from an engine for converting rotational energy supplied by said rotational driving force into electrical energy;

starting means for providing said alternator means with an initial starting current;

rectification means responsive to said alternator means for rectifying the output voltage level of said alternator means to produce a stable DC voltage;

voltage step up means responsive to said rectification means for boosting said DC voltage to a boosted DC voltage when said DC voltage level falls below a predetermined level;

switching means responsive to said rectification means for producing a train of high voltage pulses from said stable DC voltage;

filtering means responsive to said switching means for producing from said train of high voltage pulses stable floating AC power; and control means comprising first and second control means; said first control means responsive to said stable DC voltage for controlling the output voltage level of said alternator means; and said second control means responsive to said stable floating AC power for controlling said switching means.

2. The device of claim 1, wherein said alternator means is configured to produce three phase AC power.

3. The device of claim 2, wherein said rectification means comprises semiconductor means for rectifying said three phase AC power produced by said alternator means.

4. The device of claim 3, wherein said first control means comprises alternator regulator means for sensing the output voltage level of said alternator means and limiting it to a predetermined level.

5. The device of claim 4, wherein said second control means comprises pulse width modulator means configured to utilize a high frequency carrier modulated by a low frequency signal.

6. The device of claim 5, wherein said filtering means is configured to filter out said high frequency carrier from said train of high voltage pulses to produce floating AC power whose voltage component has predetermined amplitude characteristics and whose frequency corresponds to that of said low frequency signal.

7. The device of claim 6, wherein said second control means further comprises current limiting means for limiting current to a load connected to said mobile AC power source thus protecting said AC power source from damage when an over load or over current condition exists.

8. The device of claim 7, wherein said switching means comprises full wave bridge means.

9. The device of claim 1, wherein said alternating means is connected to a source of mechanical energy for converting mechanical energy supplied by said source of mechanical energy into electrical energy.

10. The device of claim 9, further comprising third control means responsive to said boosted DC voltage for controlling said voltage step up means.

11. The device of claim 10, wherein said alternator regulator means is electrically isolated from said floating AC power.

12. The device of claim 11, wherein the voltage component of said floating AC power has an amplitude and frequency independent of RPM of said engine.

13. The device of claim 12, wherein the voltage component of said floating AC power has an amplitude ranging approximately from 100 to 500 VAC RMS and a frequency ranging approximately from 40 to 400 Hz.

14. The device of claim 13, further comprising auxiliary power source means for producing a DC power voltage.

15. The device of claim 14, wherein said auxiliary power source means is electrically isolated from said alternator means and is capable of producing a DC voltage ranging from approximately 1 to 370 VDC.

16. The device of claim 4, wherein said second control means comprises pulse width modulator means configured to utilize a high frequency carrier modulated by a low frequency sine wave signal.

17. The device of claim 16, wherein said filtering means is configured to filter out said high frequency carrier from said train of high voltage pulses to produce floating AC power whose voltage component has predetermined amplitude characteristics and whose frequency corresponds to that of said low frequency sine wave signal.

18. A mobile AC power source comprising:

alternator means connected to a source of mechanical energy for converting mechanical energy supplied by said source of mechanical energy into electrical energy;

starting means for providing said alternator means with an initial starting current;

rectification means responsive to said alternator means for rectifying the output voltage level of said alternator means to produce a stable DC voltage;

voltage step up means responsive to said rectification means for boosting said DC voltage to a boosted DC voltage when said DC voltage falls below a predetermined value;

switching means responsive to said voltage step up means for producing a train of high voltage pulses from said boosted DC voltage;

filtering means responsive to said switching means for producing from said train of high voltage pulses stable floating AC power; and control means comprising first, second and third control means; said first control means responsive to said stable DC voltage for controlling the output voltage level of said alternator means; said second control means responsive to said stable floating AC power for controlling said switching means; and said third control means responsive to said boosted DC voltage for controlling said voltage step up means.

19. The device of claim 18, wherein said second and third control means are electrically isolated from said floating AC power.

20. A mobile AC power source comprising:

alternator means connected to a source of mechanical energy for converting mechanical energy supplied by said source of mechanical energy into electrical energy;

starting means for providing said alternator means with an initial starting current;

step up and step down transformer means responsive to said alternator means for increasing and decreasing the output voltage level of said alternator means;

rectification means responsive to said step up transformer means for rectifying said increased voltage level to produce a stable DC voltage;

switching means responsive to said rectification means for producing a train of high voltage pulses from said stable DC voltage;

filtering means responsive to said switching means for producing from said train of high voltage pulses stable floating AC power; and control means comprising first and second control means; said first control means responsive to said stable DC voltage for controlling the output voltage level of said alternator means; and said second control means responsive to said stable floating AC power for controlling said switching means.

* * * * *